US009389482B2

(12) United States Patent
Yamazaki

(10) Patent No.: US 9,389,482 B2
(45) Date of Patent: Jul. 12, 2016

(54) ELECTROPHORESIS DISPLAY DEVICE, DRIVING METHOD OF ELECTROPHORESIS DISPLAY DEVICE, AND ELECTRONIC APPARATUS

(71) Applicant: Seiko Epson Corporation, Tokyo (JP)

(72) Inventor: Katsunori Yamazaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 20 days.

(21) Appl. No.: 14/597,725

(22) Filed: Jan. 15, 2015

(65) Prior Publication Data
US 2015/0205179 A1 Jul. 23, 2015

(30) Foreign Application Priority Data

Jan. 21, 2014 (JP) ................................. 2014-008795

(51) Int. Cl.
G02B 26/00 (2006.01)
G09G 3/34 (2006.01)
G02F 1/167 (2006.01)

(52) U.S. Cl.
CPC ................ G02F 1/167 (2013.01); G09G 3/344 (2013.01); G02F 2001/1672 (2013.01); G02F 2001/1676 (2013.01); G09G 3/34 (2013.01); G09G 2300/0426 (2013.01); G09G 2320/0233 (2013.01)

(58) Field of Classification Search
CPC ............ G02F 1/167; G02F 2001/1672; G02F 2001/1676; G02F 2001/1678; G09G 3/34; G09G 3/344; G09G 2300/0426; G09G 2300/0439; G09G 2320/0233

USPC ..................... 359/296; 345/60, 107, 212, 214
See application file for complete search history.

(56) References Cited

U.S. PATENT DOCUMENTS

| 7,365,732 | B2* | 4/2008 | Matsuda ................. G02F 1/167 345/107 |
| 8,902,597 | B2* | 12/2014 | Sato ........................ G02F 1/167 361/749 |
| 2008/0238867 | A1 | 10/2008 | Maeda et al. |
| 2012/0001889 | A1* | 1/2012 | Kimura ................... G09G 3/344 345/212 |
| 2014/0145182 | A1* | 5/2014 | Yamazaki ............. H01L 27/124 257/43 |

FOREIGN PATENT DOCUMENTS

JP 2010-256919 A 11/2010

* cited by examiner

Primary Examiner — Loha Ben
(74) Attorney, Agent, or Firm — ALG Intellectual Property, LLC

(57) ABSTRACT

An electrophoresis display device includes: a pair of substrates; an electrophoresis layer which is pinched between the pair of substrates, and includes a partition and electrophoresis particles that are disposed in plural regions which are divided by the partition; a display portion which includes a plurality of pixels; a pixel electrode which is formed on the plurality of pixels; a facing electrode which faces the plurality of pixel electrodes via the electrophoresis layer; a first control line and a second control line which are electrically connected to the pixel electrodes; and a shielding layer which is disposed between the first control line and the electrophoresis layer and between the second control line and the electrophoresis layer, and can perform a potential input.

20 Claims, 13 Drawing Sheets

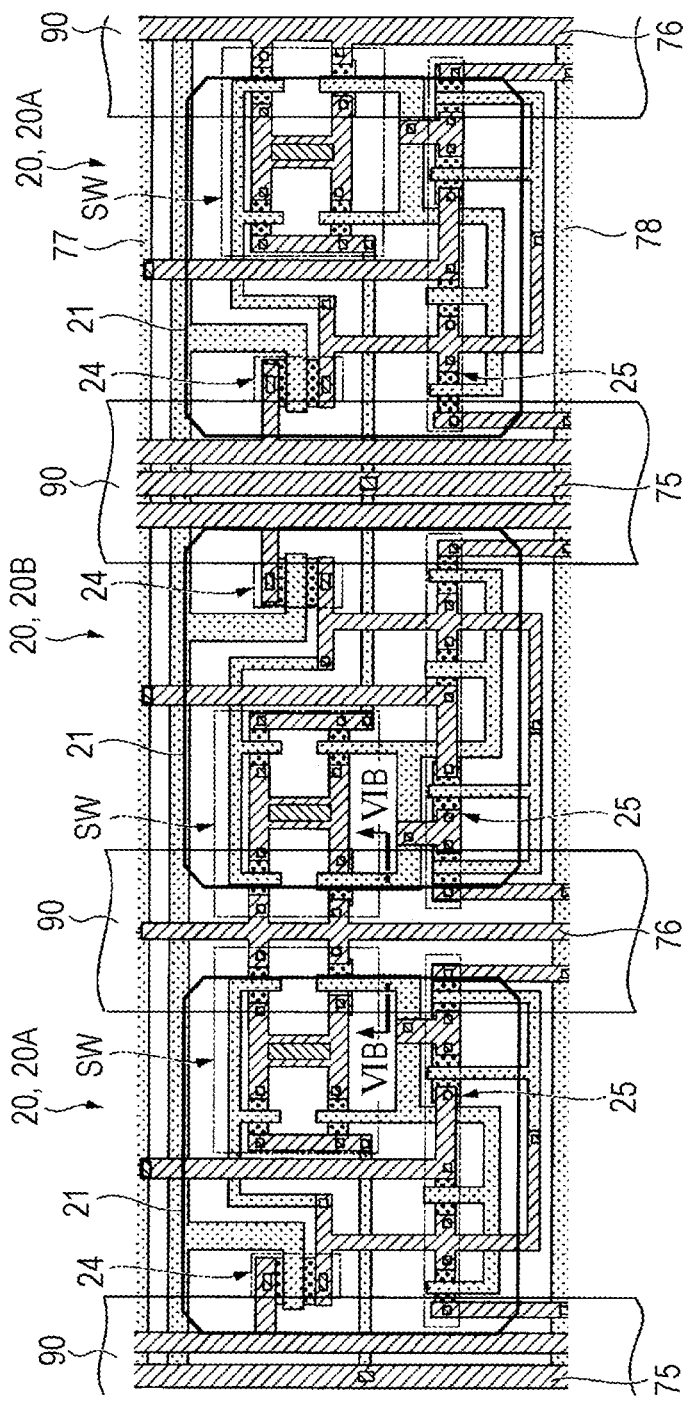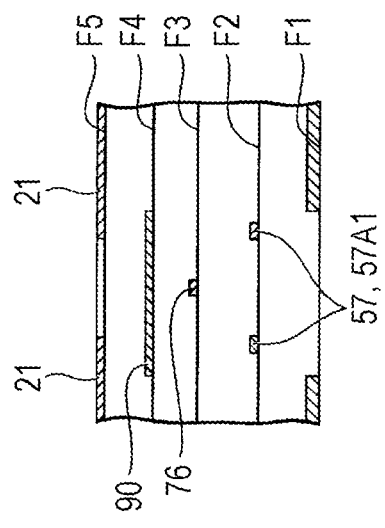
FIG. 6A
FIG. 6B

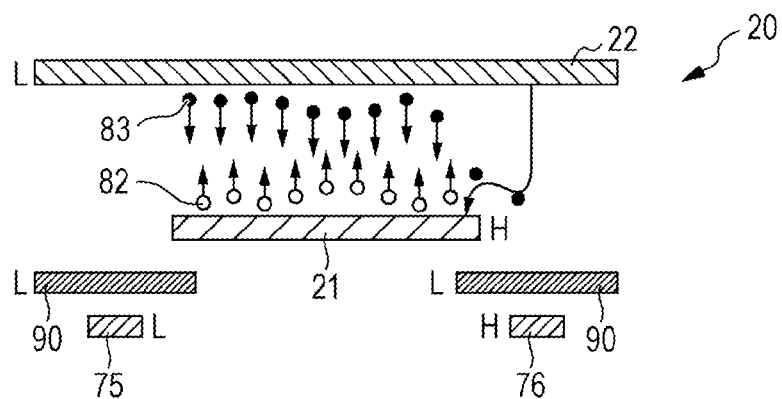
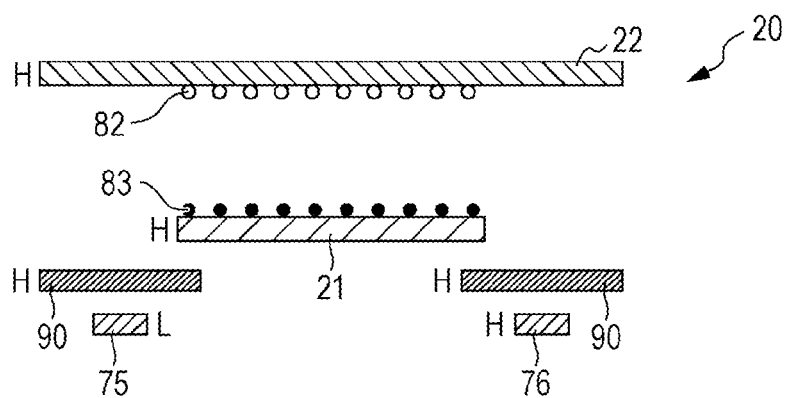
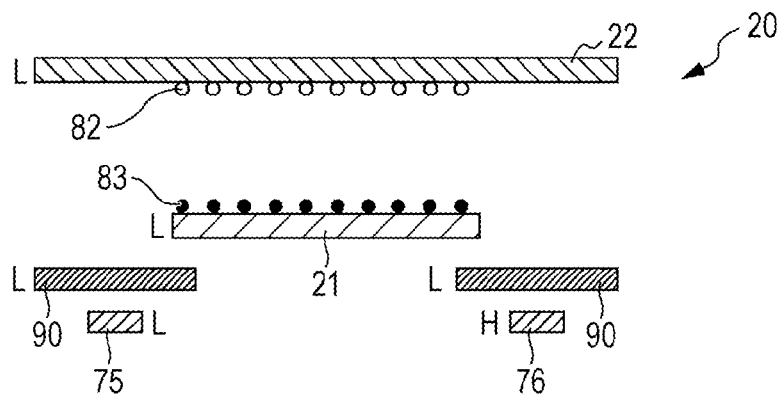
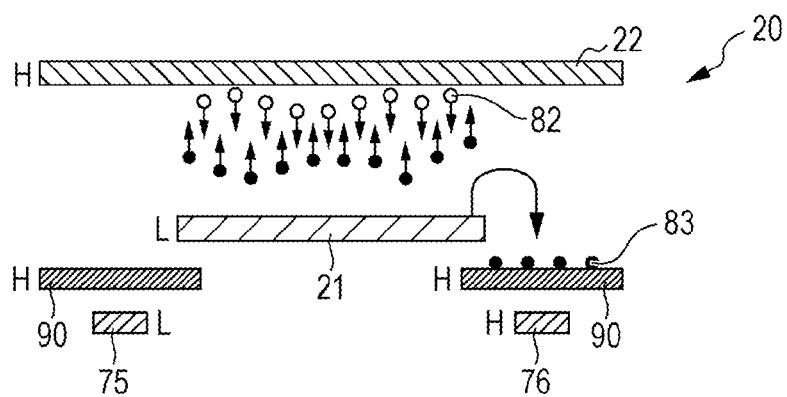

ELECTROPHORESIS DISPLAY DEVICE, DRIVING METHOD OF ELECTROPHORESIS DISPLAY DEVICE, AND ELECTRONIC APPARATUS

BACKGROUND

1. Technical Field

The present invention relates to an electrophoresis display device, a driving method of the electrophoresis display device, and an electronic apparatus.

2. Related Art

In the related art, as an electrophoresis display device, a device, which is provided with a switching element, a memory circuit, and a switch circuit which switches a connection state between a pixel electrode that is switched by an output signal of the memory circuit and a first or a second control line, in every pixel, is known (for example, refer to JP-A-2010-256919 described below).

In the electrophoresis display device in the above-described related art, the first or the second control lines are commonly provided in all of the pixels. Therefore, at least a part of the first and the second control lines is not blocked by other wirings, and is disposed to face a facing electrode via an electrophoresis element. For this reason, there is a problem in that the number of electrophoresis particles for display decreases as the electrophoresis particles are gradually deposited on the control line part when repeating an image display, and a display unevenness is generated.

SUMMARY

An advantage of some aspects of the invention is to provide an electrophoresis display device which obtains excellent display quality as deposition of electrophoresis particles is suppressed, a driving method of the electrophoresis display device, and an electronic apparatus.

According to a first aspect of the invention, there is provided an electrophoresis display device including: a pair of substrates; an electrophoresis layer which is pinched between the pair of substrates, and includes a partition and electrophoresis particles that are disposed in each of plural regions which are divided by the partition; a display portion which includes a plurality of pixels; a pixel electrode which is formed on each of the plurality of pixels; a facing electrode which faces the plurality of pixel electrodes via the electrophoresis layer; a first control line and a second control line which are electrically connected to the pixel electrodes and have a part that is not overlapped with the partition when viewed in a plan view; and a shielding layer which is disposed between the first control line and the electrophoresis layer and between the second control line and the electrophoresis layer, is overlapped with the first control line and the second control line when viewed in a plan view, and can perform a potential input.

In this case, since the shielding layer which is overlapped with the first control line and the second control line is provided, a potential which is generated between the first control line and the facing electrode and between the second control line and the facing electrode, is blocked. Therefore, an electric field is not generated between the first control line and the facing electrode and between the second control line and the facing electrode. Accordingly, the electrophoresis particles are unevenly distributed and do not remain at a part which corresponds to the first control line and the second control line. Therefore, by suppressing deposition of the electrophoresis particles, it is possible to obtain excellent display quality without a display unevenness.

According to the aspect, it is preferable that a potential which is different from that of the pixel electrode be input into the shielding layer.

In this configuration, since the potential (for example, a potential having positive or negative polarity based on a potential of the pixel electrode) which is different from that of the pixel electrode is input into the shielding layer, the electrophoresis particles which are deposited on the shielding layer are expelled by a repulsive force as the potential of the shielding layer changes according to the pixel electrode. Therefore, deposition of the electrophoresis particles is suppressed.

According to the aspect, it is preferable that the same potential as that of the facing electrode be input into the shielding layer in synchronization with the timing when the potential is input into the facing electrode.

In this configuration, it is possible to input the same potential into the shielding layer in synchronization with the potential of the facing electrode. Accordingly, since the potential of the shielding layer changes together with the potential of the facing electrode, deposition of the electrophoresis particles at a part which corresponds to the shielding layer is suppressed.

According to the aspect, it is preferable that the potential be input into the shielding layer so that a potential difference between the shielding layer and the facing electrode is small compared to a potential difference between the facing electrode and the pixel electrode in synchronization with the timing when the potential is input into the facing electrode.

In this configuration, since the potential difference between the shielding layer and the facing electrode is smaller than the potential difference between the facing electrode and the pixel electrode, it is possible to move the electrophoresis particles to the facing electrode side.

According to the aspect, it is preferable that the potential which is reversed with respect to the potential of the facing electrode be input into the shielding layer, for every certain period in which an image is written into the display portion.

In this configuration, since the reversed potential is input into the shielding layer for every one frame period, it is possible to excellently generate a repulsive force to the electrophoresis particles, and deposition of the electrophoresis particles to the part that corresponds to the shielding layer is suppressed.

According to the aspect, it is preferable that the potential during an image writing operation into the display portion be input into the shielding layer.

In this configuration, it is possible to suppress deposition of the electrophoresis particles according to the image writing operation.

According to the aspect, it is preferable that the shielding layer be formed on the same layer as the pixel electrode.

In this configuration, it is possible to form the pixel electrode and the shielding layer at the same process. Accordingly, it is possible to simplify a manufacturing process, and to reduce a manufacturing cost.

According to the aspect, it is preferable that the shielding layer be formed on a layer between the pixel electrode and the first control line and between the pixel electrode and the second control line.

In this configuration, since it is possible to form the shielding layer and the pixel electrode in a separate process, it is possible to form the shielding layer in a state where the first control line and the second control line are reliably covered when viewed in a plan view.

According to the aspect, it is preferable that the shielding layer be formed to be overlapped with an end portion of the pixel electrode when viewed in a plan view.

In this configuration, when viewed in a plan view, a void is prevented from being generated between the pixel electrode and the shielding layer. Accordingly, in the void, the electric field is prevented from being generated between the first and the second control lines and the facing electrode.

According to the aspect, it is preferable that the shielding layer be formed to be integrated with the pixel electrode.

In this configuration, it is possible to configure the shielding layer by using a part of the pixel electrode. Accordingly, since it is not required that the shielding layer be formed additionally, it is possible to reduce a manufacturing cost.

According to a second aspect, there is provided a driving method of an electrophoresis display device including: a pair of substrates; an electrophoresis layer which is pinched between the pair of substrates, and includes a partition and electrophoresis particles that are disposed in each of plural regions which are divided by the partition; a display portion which includes a plurality of pixels; a pixel electrode which is formed on each of the plurality of pixels; a facing electrode which faces the plurality of pixel electrodes via the electrophoresis layer; a first control line and a second control line which are electrically connected to the pixel electrodes and have a part that is not overlapped with the partition when viewed in a plan view; and a shielding layer which is disposed between the first control line and the electrophoresis layer and between the second control line and the electrophoresis layer, and is overlapped with the first control line and the second control line when viewed in a plan view. The driving method of the electrophoresis display device includes inputting a potential which is different from that of the pixel electrode into the shielding layer.

In this case, since the potential which is different from that of the pixel electrode is input into the shielding layer which is overlapped with the first control line and the second control line, the potential which is generated between the first and the second control lines and the facing electrode is blocked. Accordingly, the electric field is prevented from being generated between the first control line and the facing electrode and between the second control line and the facing electrode. According to this, the electrophoresis particles are unevenly distributed and do not remain at a part which corresponds to the first control line and the second control line, and it is possible to obtain excellent display quality without a display unevenness as deposition of the electrophoresis particles is suppressed. In addition, since the potential (for example, a potential having positive or negative polarity based on a potential of the pixel electrode) which is different from that of the pixel electrode is input into the shielding layer, the electrophoresis particles which are deposited on the shielding layer are expelled by a repulsive force as the potential of the shielding layer changes according to the pixel electrode.

According to the aspect, in inputting the potential, it is preferable that the same potential as that of the facing electrode be input into the shielding layer, in synchronization with the timing when the potential is input into the facing electrode.

In this case, the same potential can be input into the shielding layer in synchronization with the facing electrode. Accordingly, since the potential of the shielding layer changes together with the potential of the facing electrode, deposition of the electrophoresis particles at a part which corresponds to the shielding layer is suppressed.

According to the aspect, it is preferable that the potential be input into the shielding layer so that a potential difference between the shielding layer and the facing electrode is small compared to a potential difference between the facing electrode and the pixel electrode in synchronization with the timing when the potential is input into the facing electrode.

In this case, since the potential difference between the shielding layer and the facing electrode is smaller than the potential difference between the facing electrode and the pixel electrode, it is possible to move the electrophoresis particles to the facing electrode side.

According to the aspect, it is preferable that inputting the potential be performed for every one frame period in which an image is written into the display portion, and polarity of the potential which is input into the shielding layer for every frame period be reversed.

In this configuration, since the potential in which the polarity is reversed is input into the shielding layer for every one frame period, it is possible to excellently generate the repulsive force to the electrophoresis particles, and deposition of the electrophoresis particles to the part which corresponds to the shielding layer is suppressed.

According to the aspect, it is preferable that inputting the potential be performed during an image writing operation into the display portion.

In this configuration, it is possible to suppress deposition of the electrophoresis particles according to the image writing operation.

According to a third aspect, there is provided an electronic apparatus including the electrophoresis display device according to the first aspect.

In this case, since the electrophoresis display device without a display unevenness is provided, the electronic apparatus itself also has a high added value with excellent display quality.

BRIEF DESCRIPTION OF THE DRAWINGS

The invention will be described with reference to the accompanying drawings, wherein like numbers reference like elements.

FIGS. 6A and 6B are views illustrating a configuration of three pixels.

FIGS. 10A to 10D are views illustrating an operation by the electrostatic shielding layer.

DESCRIPTION OF EXEMPLARY EMBODIMENTS

Figure 1:
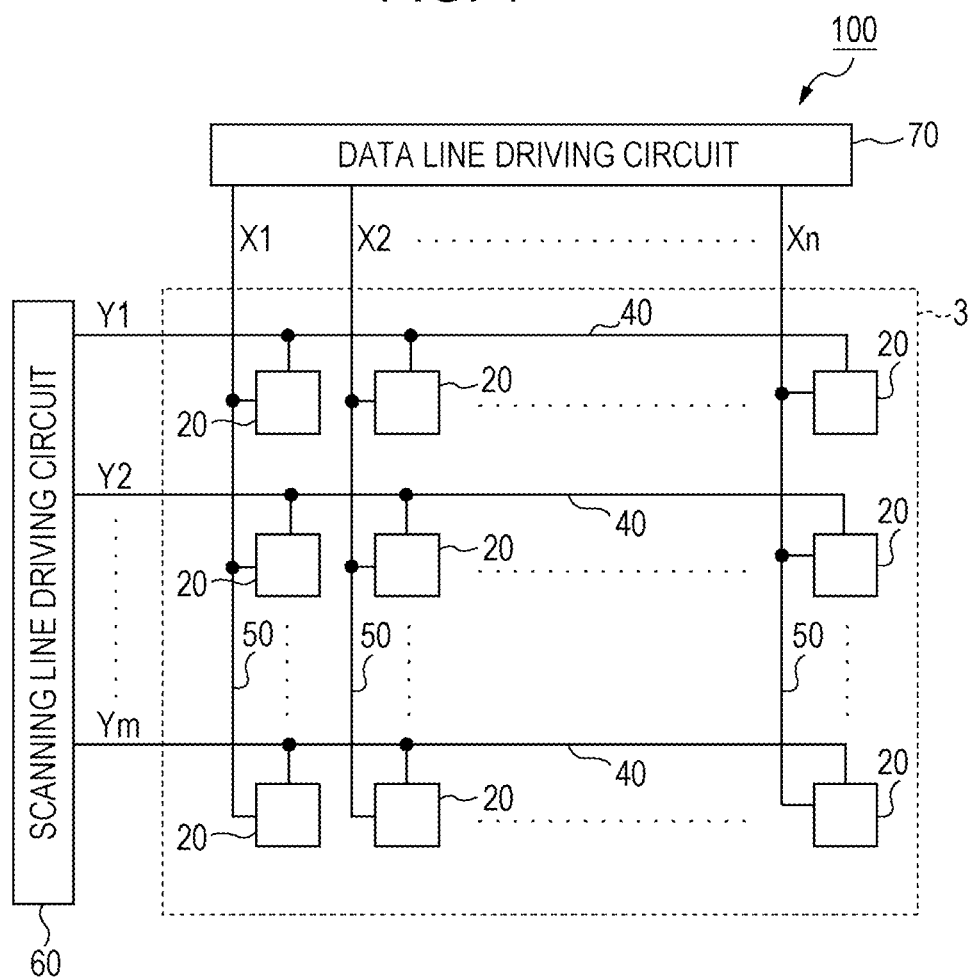
FIG. 1 is a plan view illustrating a schematic configuration of an electrophoresis display device.

Hereinafter, an embodiment of the invention will be described with reference to the drawings. In the embodiment, an electrophoresis display device which is driven by an active matrix method will be described as an example. In addition, in the drawings described below, in order to make it easy to understand each configuration, dimensions or numbers in an actual structure are different from those for each structure.

FIG. 1 is a plan view illustrating a schematic configuration of an electrophoresis display device according to the embodiment. An electrophoresis display device 100 includes a display portion 3 in which a plurality of pixels 20 is arranged, a scanning line drive circuit 60, and a data line drive circuit 70.

In the display portion 3, a plurality of scanning lines 40 (Y1, Y2, . . . , Ym) which extends from the scanning line drive circuit 60, and a plurality of data lines 50 (X1, X2, . . . , Xn) which extends from the data line drive circuit 70, are formed. The pixels 20 are disposed corresponding to an intersection portion between the scanning line 40 and the data line 50. Each of the pixels 20 is connected to the scanning line 40 and the data line 50.

In addition, on the periphery of the display portion 3, in addition to the scanning line drive circuit 60 and the data line drive circuit 70, a common power supply modulation circuit (not illustrated) or a controller (not illustrated) are disposed. The controller comprehensively controls each circuit, based on image data or a synchronous signal which is supplied from the upper level device.

In addition, in each pixel 20, in addition to the scanning line 40 and the data line 50, a high potential power supply line 78, a low potential power supply line 77, a first control line 75, and a second control line 76, are connected to each other by the common power supply modulation circuit. The common power supply modulation circuit generates various types of signals to be supplied to each of the above-described wirings based on controlling of the controller, and performs electric connection and disconnection (change into a high impedance) of each wiring.

Figure 2:
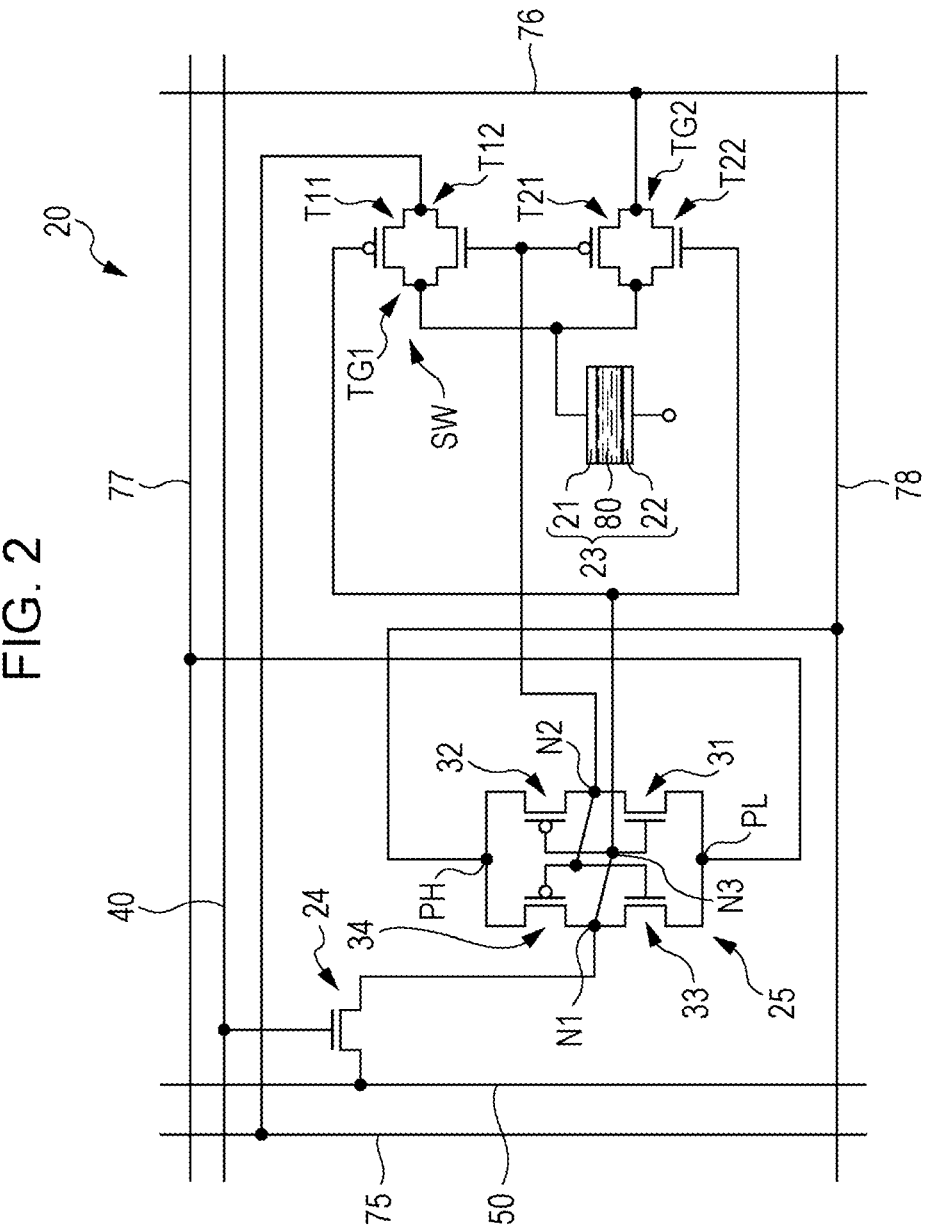
FIG. 2 is a view illustrating a circuit configuration of a pixel.

FIG. 2 is a view illustrating a circuit configuration of the pixel 20.

As illustrated in FIG. 2, the pixel 20 includes a pixel switching element 24, a latch circuit (memory circuit) 25, a switch circuit SW for potential control, and an electrophoresis element 23. The electrophoresis element 23 includes a pixel electrode 21, a facing electrode 22, and an electrophoresis layer 80 which is disposed between the pixel electrode 21 and the facing electrode 22. The switch circuit SW includes transfer gates TG1 and TG2.

The pixel switching element 24 is a field effect N-type transistor. The scanning line 40 is connected to a gate terminal of the pixel switching element 24, the data line 50 is connected to a source terminal of the pixel switching element 24, and an input terminal N1 of the latch circuit 25 is connected to a drain terminal of the pixel switching element 24. The pixel switching element 24 connects the data line 50 and the latch circuit 25 to each other during a period when a selected signal is input via the scanning line 40 from the scanning line drive circuit 60. According to this, the pixel switching element 24 is used for inputting an image signal which is input via the data line 50 from the data line drive circuit 70 into the latch circuit 25.

The latch circuit 25 is configured of two P-type transistors 32 and 34, and two N-type transistors 31 and 33. The high potential power supply line 78 is connected to source sides of the P-type transistors 32 and 34, and the low potential power supply line 77 is connected to source sides of the N-type transistors 31 and 33. Therefore, the source sides of the P-type transistors 32 and 34 are high potential power supply terminals PH of the latch circuit 25, and the source sides of the N-type transistors 31 and 33 are low potential power supply terminals PL of the latch circuit 25.

The latch circuit 25 includes an input terminal N1 which is connected to a drain side of the pixel switching element 24, and a first output terminal N2 and a second output terminal N3 which are connected to the switch circuit SW.

A drain side of the P-type transistor 34 of the latch circuit 25 and a drain side of the N-type transistor 33 of the latch circuit 25 function as the input terminal N1 of the latch circuit 25. The input terminal N1 is connected to the drain side of the pixel switching element 24, and is connected to the second output terminal N3 (a gate portion of the P-type transistor 32 and a gate portion of the N-type transistor 31) of the latch circuit 25.

Furthermore, the second output terminal N3 is connected to the transfer gates TG1 and TG2.

The drain side of the P-type transistor 32 of the latch circuit 25 and the drain side of the N-type transistor 31 of the latch circuit 25 function as the first output terminal N2 of the latch circuit 25.

The first output terminal N2 is connected to a gate portion of the P-type transistor 34 and a gate portion of the N-type transistor 33, and is connected to the transfer gates TG1 and TG2.

The latch circuit 25 is a circuit which corresponds to a static random access memory (SRAM) cell. The latch circuit 25 maintains the image signal which is sent from the pixel switching element 24, and is used for inputting the image signal into the switch circuit SW. Based on the image signal which is input from the latch circuit 25, the switch circuit SW alternatively selects any one of the first control line 75 and the second control line 76, and functions as a selector which connects the selected control line to the pixel electrode 21. At this time, only one of the transfer gates TG1 and TG2 operates according to a level of the image signal.

The transfer gate TG1 is provided with a field effect P-type transistor T11 and a field effect N-type transistor T12. A source terminal of the P-type transistor T11 and a source terminal of the N-type transistor T12 are connected to each other, and are connected to the first control line 75. A drain terminal of the P-type transistor T11 and a drain terminal of the N-type transistor T12 are connected to each other, and are connected to the pixel electrode 21. The gate terminal of the P-type transistor T11 is connected to the input terminal N1 of the latch circuit 25, and the gate terminal of the N-type transistor T12 is connected to the first output terminal N2 of the latch circuit 25.

The transfer gate TG2 is provided with a field effect P-type transistor T21 and a field effect N-type transistor T22. A source terminal of the P-type transistor T21 and a source terminal of the N-type transistor T22 are connected to each other, and are connected to the second control line 76. A drain terminal of the P-type transistor T21 and a drain terminal of the N-type transistor T22 are connected to each other, and are connected to the pixel electrode 21.

In addition, a gate terminal of the P-type transistor T21 is connected to the output terminal N2 of the latch circuit 25, together with a gate terminal of the N-type transistor T12 of the transfer gate TG1. A gate terminal of the N-type transistor T22 is connected to the input terminal N1 of the latch circuit 25, together with a gate terminal of the P-type transistor T11 of the transfer gate TG1. In addition, the first control line 75 and the second control line 76 are disposed in parallel to each pixel 20.

For example, when a low level (L: a potential which is close to a potential of the low potential power supply line 77) is input into the input terminal N1 of the latch circuit 25 as the image signal, a high level (H: a potential which is close to a potential of the high potential power supply line 78) is output from the first output terminal N2. For this reason, the N-type transistor T12 which is connected to the first output terminal N2 operates, the P-type transistor T11 which is connected to the second output terminal N3 (input terminal N1) operates, and thus, the transfer gate TG1 is driven. Therefore, the first control line 75 and the pixel electrode 21 are electrically connected to each other.

Meanwhile, when a high level (H) is input into the input terminal N1 of the latch circuit 25 as the image signal, the low level (L) is output from the first output terminal N2. For this reason, the P-type transistor T21 which is connected to the first output terminal N2 operates, the N-type transistor T22 which is connected to the second output terminal N3 (input terminal N1) operates, and thus, the transfer gate TG2 is driven. Therefore, the second control line 76 and the pixel electrode 21 are electrically connected to each other.

Via the transfer gate which operates, the first control line 75 or the second control line 76 is electrically conducted with the pixel electrode 21, and the potential is input into the pixel electrode 21.

Figure 3:
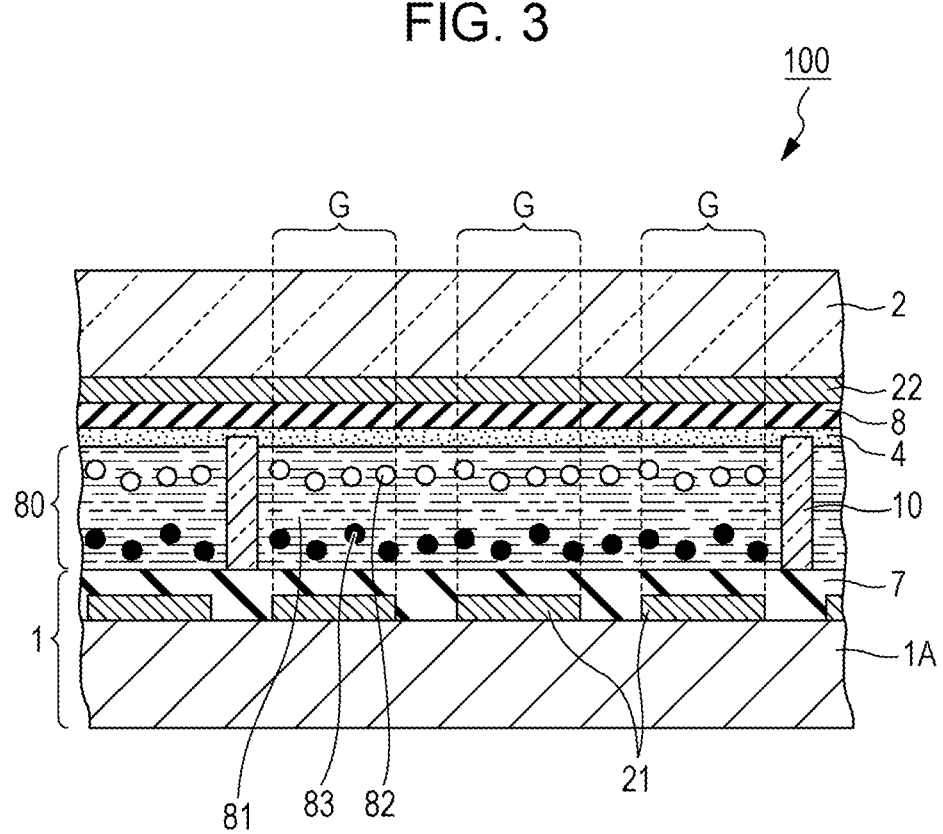
FIG. 3 is a schematic cross-sectional configuration view of the electrophoresis display device.

FIG. 3 is a cross-sectional view illustrating a schematic configuration of the electrophoresis display device 100 according to the embodiment. As illustrated in FIG. 3, the electrophoresis display device 100 includes an element substrate 1, a facing substrate 2, and the electrophoresis layer 80 between the element substrate 1 and the facing substrate 2.

The element substrate 1 includes a base material 1A, the pixel electrode 21 which is provided on an electrophoresis layer 11 side of the base material 1A, and a first insulation film 7 which covers the pixel electrode 21. The base material 1A is a substrate which is made of glass or plastic, and may not be transparent since the base material 1A is disposed on an opposite side to an image display surface. The pixel electrode 21 is an electrode in which nickel plating and gold plating are layered in order on a Cu foil, or is an electrode which is formed of Al or ITO (indium tin oxide). Although not illustrated in the drawing, the scanning line 40, the data line 50, and the pixel switching element 24 are formed between the pixel electrode 21 and the base material 1A.

The facing substrate 2 is configured of a transparent base material, such as glass or plastic, and is disposed on an image display side. The facing electrode 22 which faces the plurality of pixel electrodes 21 is formed on the electrophoresis layer 80 side of the facing substrate 2. The entire surface of the facing electrode 22 is covered by a second insulation film 8. The facing electrode 22 is a transparent electrode which is formed of MgAg, ITO, IZO (indium-zinc oxide), or the like.

The electrophoresis layer 80 fills a plurality of spaces (regions) which is partitioned by the first insulation film 7 provided on an inner surface side of the element substrate 1, the second insulation film 8 provided on an inner surface side of the facing substrate 2, and a partition 10 disposed between the first insulation film 7 and the second insulation film 8. In the embodiment, the partition 10 corresponds to a size at which the plurality (for example, three in the embodiment) of pixels 20 is divided, and is configured of a light transmissive material (acryl or epoxy resin).

A thickness of the partition 10 is 30 µm, for example. In addition, a bonding layer 4 is provided between an upper portion of the partition 10 and the second insulation film 8. The bonding layer 4 is a layer for bonding the facing substrate 2 and the element substrate 1 in which the partition 10 is formed. The bonding layer 4 is configured of a transparent resin, for example, and the upper portion of the partition 10 is buried into the bonding layer 4. A thickness of the bonding layer 4 may be to the extent that does not disturb the electric field, and it is preferable that the thickness of the bonding layer 4 be approximately 2 µm to 6 µm, for example. In addition, it is preferable that an amount of burying of the partition 10 into the bonding layer 4 be 0.5 µm to 1 µm, for example.

The electrophoresis layer 80 is configured of a plurality of electrophoresis particles which is dispersed in a dispersion medium 81. In the embodiment, the electrophoresis particles are configured of white particles 82 and black particles 83, for example.

The white particles 82 are, for example, particles (a polymer or a colloid) which are made of white pigments, such as a titanium oxide, a zinc oxide, or an antimony trioxide, and, for example, are used by being negatively charged. The black particles 83 are, for example, particles (a polymer or a colloid) which are made of black pigments, such as aniline black or carbon black, and for example, are used by being positively charged. In these pigments, if necessary, it is possible to add a charge control agent which is made of particles of an electrolyte, a surfactant, a metal soap, a resin, rubber, oil, varnish, or a compound, a dispersing agent, such as titanium-based coupling agent, an aluminum-based coupling agent, or a silane-based coupling agent, a lubricant, a stabilizing agent, or the like.

In addition, instead of the white particles 82 and the black particles 83, for example, pigments, such as red color, green color, or blue color, may be used. In this configuration, by displaying the red color, the green color, and the blue color, it is possible to provide the electrophoresis display device 100 which can perform color display.

Examples of the dispersion medium 81 can include water, an alcohol-based solvent (methanol, ethanol, isopropanol, butanol, octanol, or methyl cellosolve), ester (ethyl acetate or butyl acetate), ketone (acetone, methyl ethyl ketone, or methyl isobutyl ketone), aliphatic hydrocarbon (petane, hexane, or octane), alicyclic hydrocarbon (cyclohexane or methylcyclohexane), aromatic hydrocarbon (benzene, toluene, xylene, benzene having a long chain alkyl group (hexylbenzene, heptylbenzene, octylbenzene, nonylbenzene, decylbenzene, undecylbenzene, dodecylbenzene, tridecylbenzen, or tetradecylbenzene)), halogenated hydrocarbon (methylene chloride, chloroform, carbon tetrachloride, or 1,2-dichloroethane), or silicone oil, and may include other types of oil. These materials can be used independently or as a mixture. Furthermore, a surfactant, such as carboxylate, may be mixed.

Based on this configuration, in the electrophoresis display device 100, for example, when a voltage is input between the pixel electrode 21 and the facing electrode 22, the electric field is generated therebetween. Accordingly, as illustrated later, the electrophoresis particles (the white particles 82 and the black particles 83) are electophoresed facing any one of the electrodes (the pixel electrode 21, the facing electrode 22).

Figure 4A:
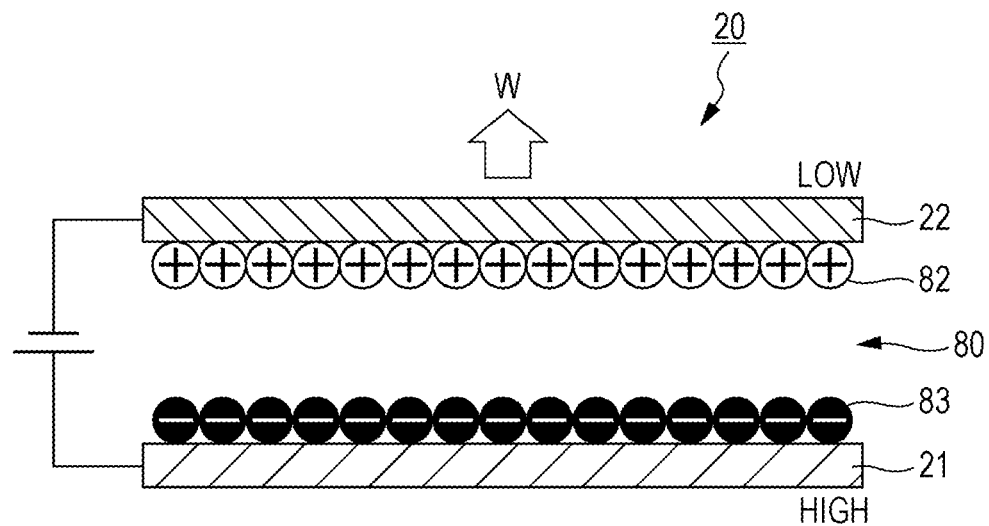
FIGS. 4A and 4B are views illustrating an operation of electrophoresis elements.
Figure 4B:
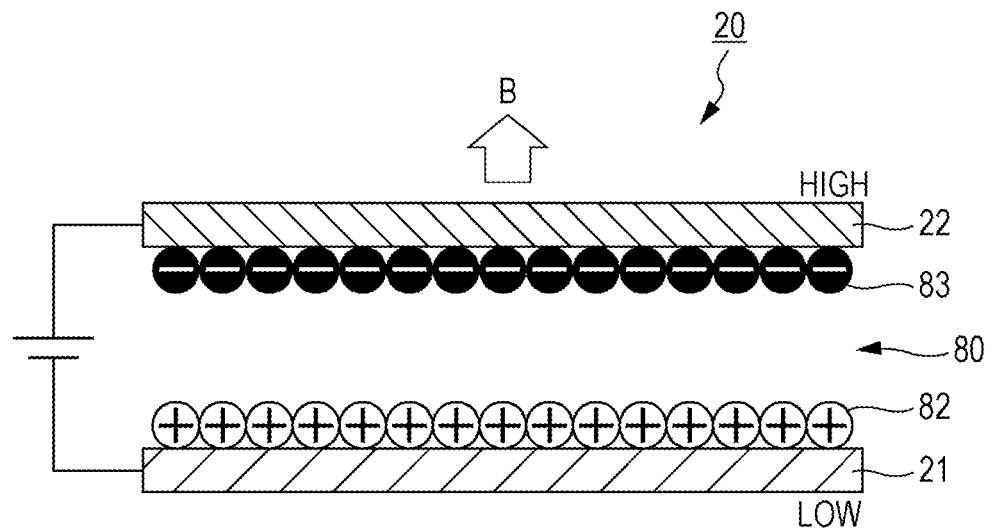

FIGS. 4A and 4B are views illustrating an operation of electrophoresis particles (the white particles 82 and the black particles 83). FIG. 4A illustrates a case where the pixel 20 is displayed in white, and FIG. 4B illustrates a case where the pixel 20 is displayed in black, respectively. In the embodiment, the white particles 82 are positively charged, and the black particles 83 are negatively charged.

In the case of the white display illustrated in FIG. 4A, the facing electrode 22 is maintained at a relatively low potential, and the pixel electrode 21 is maintained at a relatively high potential. Accordingly, while the white particles 82 which are positively charged gravitate to the facing electrode 22, the black particles 83 which are negatively charged gravitate to the pixel electrode 21. As a result, when the pixel 20 is viewed from the facing electrode 22 side which is a display surface side, a white color (W) is recognized.

Meanwhile, in the case of the black display illustrated in FIG. 4B, the facing electrode 22 is maintained at a relatively high potential, and the pixel electrode 21 is maintained at a relatively low electrode. Accordingly, while the black particles 83 which are negatively charged gravitate to the facing electrode 22, the white particles 82 which are positively charged gravitate to the pixel electrode 21. As a result, when the pixel is viewed from the facing electrode 22 side, a black color (B) is recognized.

Figure 5:
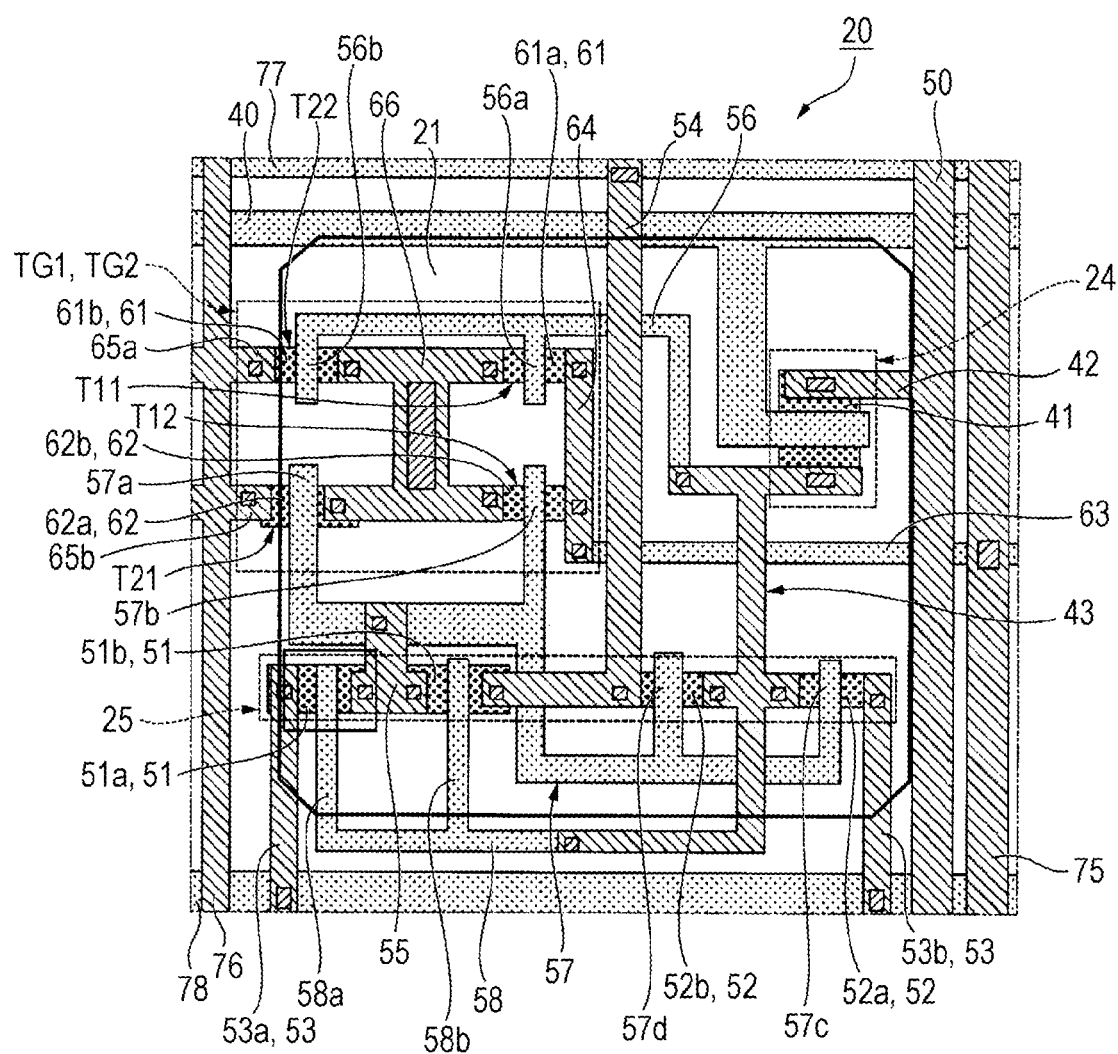
FIG. 5 is a view illustrating a configuration of one pixel.

FIG. 5 is a plan view illustrating a detail circuit configuration of one pixel 20 in the electrophoresis display device 100 according to the embodiment. In addition, in FIG. 5, in order to make the drawing easy to be understood, an electrostatic shielding layer 90 is omitted.

The pixel 20 has a layered structure. As illustrated in FIG. 5, a semiconductor layer is provided on a first layer F1 (refer to FIG. 6B) which is the lowest layer. In addition, various wirings are formed on a second layer F2 (refer to FIG. 6B) which is an upper layer of the first layer and on a third layer F3 (refer to FIG. 6B) which is an upper layer of the second layer. In addition, the electrostatic shielding layer 90 which will be described later is formed on a fourth layer F4 (refer to FIG. 6B) which is an upper layer of the third layer. In addition, the pixel electrode 21 is formed on a fifth layer F5 (refer to FIG. 6B). Each layer is insulated by an insulation layer which is not illustrated in the drawing.

First, wiring which is provided on the periphery of the pixel 20 will be described. The scanning line 40, the data line 50, the high potential power supply line 78, the low potential power supply line 77, the first control line 75, and the second control line 76 are provided on the periphery of the pixel 20. The wirings are formed to be saddled on the plurality of pixels 20. At least a part of the first control line 75 and the second control line 76 has a part which is not overlapped with the partition 10 when viewed in a plan view. Among these, the scanning line 40 and the data line 50 are orthogonal to each other in the right upper angle portion of the drawing of the pixel 20.

In addition, the high potential power supply line 78 and the low potential power supply line 77 are disposed in parallel to each other vertically in the drawing of pixel 20. The first control line 75 and the second control line 76 are disposed to face each other horizontally in the drawing of the pixel 20. Among these wirings, the scanning line 40, the low potential power supply line 77 and the high potential power supply line 78 are formed on the same layer (second layer), and the data line 50, the first control line 75, and the second control line 76 are formed on the same layer which is an upper layer (third layer F3) of the above-described second layer F2.

Next, a configuration of the wiring and the semiconductor layer which are provided inside the pixel 20 will be described. On the first layer F1 which is the lowest layer in the pixel 20, the semiconductor layers 41, 51, 52, 61, and 62 are formed. All of these semiconductor layers are configured of a semiconductor material, such as silicon. In addition, each semiconductor layer may be configured of different materials from each other.

In the embodiment, the semiconductor layer 51 includes a first semiconductor layer 51a and a second semiconductor layer 51b. The semiconductor layer 52 includes a first semiconductor layer 52a and a second semiconductor layer 52b. The semiconductor layer 61 includes a first semiconductor layer 61a and a second semiconductor layer 61b. The semiconductor layer 62 includes a first semiconductor layer 62a and a second semiconductor layer 62b. The semiconductor layers 41, 51, 52, 61, 62 are formed to in an island shape to be separated from each other.

On the second layer which is an upper layer of the first layer, wirings 56, 57, 58, and 63 are formed. The wirings are configured of metal having a high conductivity, such as copper, aluminum, or silver.

The wiring 56 includes a branched part 56a which is provided to be overlapped with the first semiconductor layer 61a when viewed in a plan view, and a branched part 56b which is provided to be overlapped with the second semiconductor layer 61b when viewed in a plan view. The P-type transistor T11 is configured of the first semiconductor layer 61a, the branched part 56a, and a gate insulation layer which is disposed therebetween, and the N-type transistor T22 is configured of the second semiconductor layer 61b, the branched part 56b, and a gate insulation layer which is disposed therebetween.

The wiring 57 includes a branched part 57a which is provided to be overlapped with the first semiconductor layer 62a when viewed in a plan view, a branched part 57b which is provided to be overlapped with the second semiconductor layer 62b when viewed in a plan view, a branched part 57c which is provided to be overlapped with the first semiconductor layer 52a when viewed in a plan view, and a branched part 57d which is provided to be overlapped with the second semiconductor layer 52b when viewed in a plan view. The P-type transistor T21 is configured of the first semiconductor layer 62a, the branched part 57a, and a gate insulation layer which is disposed therebetween, and the N-type transistor T12 is configured of the second semiconductor layer 62b, the branched part 57b, and a gate insulation layer which is disposed therebetween.

The wiring 58 includes a branched part 58a which is provided to be overlapped with the first semiconductor layer 51a when viewed in a plan view, and a branched part 58b which is provided to be overlapped with the second semiconductor layer 51b when viewed in a plan view. The latch circuit 25 is configured of the semiconductor layers 51 and 52, and the wirings 57 and 58.

The wiring 63 constitutes a part of the wiring for connecting the first control line 75 and the transistors T11 and T12 to each other. The wiring 63 is connected to the first control line 75 via a contact hole.

On the third layer which is an upper layer of the second layer, wirings 42, 43, 53, 54, 55, 64, 65, and 66 are formed. These wirings are configured of metal having a high conductivity, such as copper, aluminum, or silver, similarly to the wirings formed on the second layer.

The wiring 42 is a part which is protruded in a left direction in the drawing toward the inside of the pixel 20 from the data line 50, and is connected to one end portion of the semiconductor layer 41 via the contact hole.

The wiring 43 connects the other end portion of the semiconductor layer 41 and an end portion of the wiring 58 to each other via the contact hole. In addition, the other end portion of the semiconductor layer 41 and the wiring 56 are connected to each other via the contact hole.

The wiring 53 includes a wiring 53a which connects the high potential power supply line 78 and the first semiconductor layer 51a to each other, and a wiring 53b which connects the high potential power supply line 78 and the first semiconductor layer 52a to each other. The wiring 53 is connected to the first semiconductor layers 51a and 52a via the contact hole.

The wiring 54 is a wiring which connects the low potential power supply line 77, the second semiconductor layer 52b, and the second semiconductor layer 51b to each other. The wiring 54 is connected to the second semiconductor layers 51b and 52b via the contact hole.

The wiring 55 is connected to the first semiconductor layer 51a, the second semiconductor layer 51b, and the wiring 57, via each contact hole.

The wiring 64 is wiring which connects the first semiconductor layer 61a, the second semiconductor layer 62b, and the wiring 63 to each other. The wiring 64 is connected to the first semiconductor layer 61a, the second semiconductor layer 62b, and the wiring 63, via each contact hole. The wiring 65 includes a wiring 65a which connects the second control line 76 and the transistor (N-type transistor) T22 to each other, and a wring 65b which connects the second control line 76 and the transistor (P-type transistor) T21. Each of the wirings 65a and 65b is connect to the second semiconductor layer 61b and the first semiconductor layer 62a via the contact hole.

The wiring 66 is connected to each of the first semiconductor layers 61a and 62a, and second semiconductor layers 61b and 62b, via the contact hole. Furthermore, the wiring 66 is connected to the pixel electrode 21 which is formed on the upper layer (fifth layer) via the contact hole.

As each layer is configured in this manner, the transfer gates TG1 and TG2 are configured of the semiconductor layers 61 and 62, the wirings 56, 57, 64, and 66, and the insulation layer (not illustrated) between the first layer and the second layer.

In addition, a part which is overlapped with a part of the scanning line 40 on the semiconductor layer 41 when viewed in a plan view becomes a channel region, a part which is connected to the data line 50 via the wiring 42 becomes a source region, and a part which is connected to the wiring 43 becomes a drain region. A part (extending part) which is overlapped with the semiconductor layer 41 when viewed in a plan view in the scanning line 40 is configured of a gate electrode of the pixel switching element 24.

In addition, the latch circuit 25 is primarily configured of the semiconductor layers 51 and 52, and the wirings 53, 55, 57, and 58. Although not illustrated, the N-type transistor 31 and the P-type transistor 32 of the latch circuit 25 are configured of the semiconductor layer 51, the N-type transistor 33 and the P-type transistor 34 of the latch circuit 25 are configured of the semiconductor layer 52.

Furthermore, the field effect P-type transistor T11 is primarily configured of the first semiconductor layer 61a, and the field effect N-type transistor T12 is primarily configured of the second semiconductor layer 62b. The field effect N-type transistor T22 is primarily configured of the second semiconductor layer 61b, and the field effect P-type transistor T21 is primarily configured of the first semiconductor layer 62a. In other words, The transfer gates TG1 and TG2 are configured of the first semiconductor layer 61a, the second semiconductor layer 62b, and the wirings 56, 57, 64, and 66.

In a case where the pixel 20 is formed in this manner, the layers may be layered from the first layer to the fourth layer in order.

FIG. 6A is a plan view specifically illustrating a configuration of three pixels 20 in the electrophoresis display device 100 according to the embodiment. FIG. 6B is a plan view when viewed in a VIB-VIB line arrow in FIG. 6A.

In the embodiment, as illustrated in FIG. 6A, a configuration in which a pixel 20A and a pixel 20B which are adjacent to each other have the second control line 76 in common therebetween is employed. In the configuration illustrated in FIGS. 6A and 6B, a structure inside the pixel 20A and a structure inside the pixel 20B are in a relationship of axial symmetry with respect to the second control line 76. By being disposed in this manner, without largely changing a real arrangement of the wirings inside the pixel, it is possible to omit the number of the second control line 76. For this reason, it is possible to ensure a wide space of the pixel 20A and the pixel 20B which are adjacent to each other as much as the number of the second control line 76, and to have a margin by a distance between the wirings formed inside the pixel 20A and the pixel 20B.

In addition, in the embodiment, the electrostatic shielding layer (shielding layer) 90 which is overlapped with the first control line 75 and the second control line 76 when viewed in a plan view is provided. The electrostatic shielding layer 90 is formed in a stripe shape which is saddled on the plurality of pixels 20. The electrostatic shielding layer 90 is formed of layers in which nickel plating or gold plating is layered in order on the Cu foil, Al, or ITO (indium tin oxide). The potential can be input into the electrostatic shielding layer 90 by the controller (not illustrated).

As illustrated in FIG. 6B, in the embodiment, the electrostatic shielding layer 90 is disposed between the second control line 76 and the pixel electrode 21. In addition, although not illustrated, the electrostatic shielding layer 90 is disposed between the first control line 75 and the pixel electrode 21.

In addition, the electrostatic shielding layer 90 has a size which is overlapped with both end portions of the pixel electrode 21 between the adjacent pixels 20 when viewed in a plan view. The electrostatic shielding layer 90 has a function of shielding the generation of the electric field between the first control line 75 and the facing electrode 22 and between the second control line 76 and the facing electrode 22 as will be illustrated later.

Figure 7:
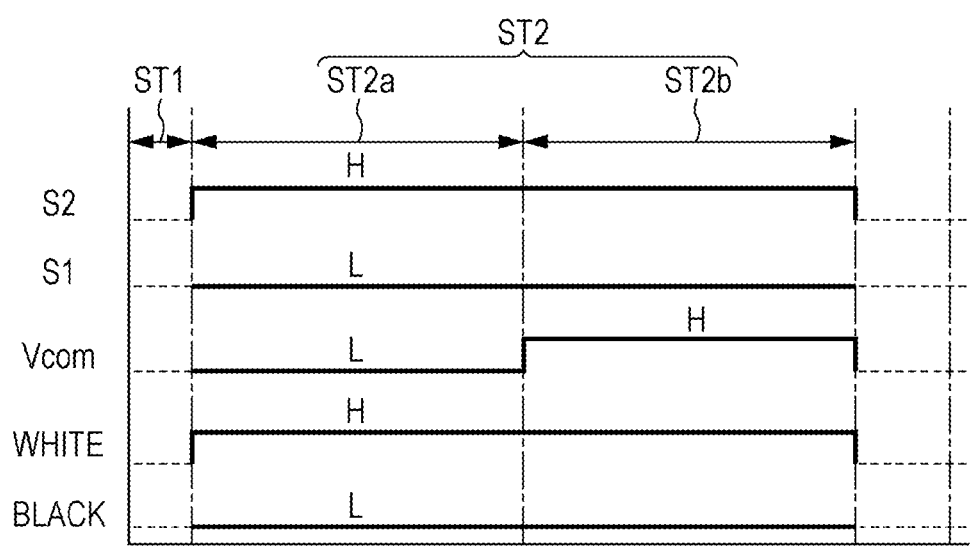
FIG. 7 is a timing chart illustrating an example of a driving method which focuses on one pixel.

Next, an effect of the electrostatic shielding layer 90 will be described, and a problem which occurs when the electrostatic shielding layer 90 is not provided will be described. FIG. 7 is a timing chart illustrating an example of a driving method which focuses on one pixel 20 in the electrophoresis display device.

As illustrated in FIG. 7, in the electrophoresis display device 100, each pixel 20 generates an image as an image signal input period ST1 transits to an image writing period ST2 in order.

During the image signal input period ST1, image data is input from the data line 50 into the latch circuit 25. Specifically, in the pixel 20 which has the above-described configuration, when low level image data is input into the latch circuit 25 via the pixel switching element 24 from the data line 50, the terminal N1 of the latch circuit 25 becomes a low level as described above.

In this case, the transfer gate TG1 becomes ON, and the pixel electrode 21 is electrically connected to the first control line 75. Then, the potential which corresponds to the first control line 75 can be input into the pixel electrode 21. In other words, as a control signal S1 from the first control line 75, for example, a potential (L) having 0 V which is a low level is input into the pixel electrode 21.

Meanwhile, when high level image data is input into the latch circuit 25 via the pixel switching element 24 from the data line 50, the transfer gate TG2 becomes ON, and the pixel electrode 21 is electrically connected to the second control line 76. Then, the potential which corresponds to the second control line 76 can be input into the pixel electrode 21. In other words, in the pixel electrode 21, as a control signal S2 from the second control line 76, for example, a potential (H) having 15 V which is a high level is input.

The electrophoresis display device 100 can display the image in the pixel 20 by inputting a predetermined potential into the pixel electrode 21 from the first control line 75 or the second control line 76 which is selected by the above-described image signal input period ST1.

Next, the image writing period ST2 will be described. As illustrated in FIG. 7, the image writing period ST2 includes a first half portion ST2*a* and a second half portion ST2*b*.

In the first half portion ST2*a* of the image writing period ST2, for example, a potential Vcom having 0 V which corresponds to a low level signal is input into the facing electrode 22. In this case, a potential difference between the pixel electrode 21 into which the potential (L) having 0 V is input from the first control line 75 and the facing electrode 22 is not generated. For this reason, the electrophoresis particles (the white particles 82 and the black particles 83) do not move.

Meanwhile, the pixel electrode 21 into which the potential (H) having 15 V is input from the second control line 76 has a potential difference of 15 V with respect to the facing electrode 22. For this reason, as the white particles 82 which are positively charged move to the facing electrode 22 side, and the black particles 83 which are negatively charged move to the pixel electrode 21 side, when seeing this pixel from the facing electrode 22 side which is a display surface, the white color (W) is recognized (refer to FIG. 4A).

In the second half portion ST2*b* of the image writing period ST2, for example, a potential Vcom having 15 V which corresponds to a high level signal is input into the facing electrode 22. In this case, a potential difference between the pixel electrode 21 into which the potential (H) having 15 V is input from the second control line 76 and the facing electrode 22 is not generated. Meanwhile, the pixel electrode 21 into which the potential (L) having 0 V is input from the first control line 75 has a potential difference of −15 V with respect to the facing electrode 22. For this reason, as the white particles 82 which are positively charged move to the pixel electrode 21 side and the black particles 83 which are negatively charged move to the facing electrode 22 side, when seeing this pixel from the facing electrode 22 side which is a display surface, the black color (B) is recognized (refer to FIG. 4B).

As described above, the pixel 20 in which the potential (L) having 0 V is input from the first control line 75 into the pixel electrode 21 becomes the black color, and the pixel 20 in which the potential (H) having 15 V is input from the second control line 76 into the pixel electrode 21 becomes the white color. Therefore, in FIG. 7, the potential which is input into the pixel electrode 21 of the pixel 20 displayed in black is considered as "Black", and the potential which is input into the pixel electrode 21 of the pixel 20 displayed in white is considered as "White".

However, both the first control line 75 and the second control line 76 are commonly formed to be saddled on the plurality of pixels 20. For this reason, between the image writing periods ST2, as the potential (L) having 0 V is always input into the first control line 75, the potential (H) having 15 V is always input into the second control line 76.

Above, when the electrostatic shielding layer 90 is not provided, a phenomenon illustrated in FIGS. 8A to 8D can be generated. FIGS. 8A to 8D are cross-sectional views for one certain pixel 20, and are views illustrating a movement of the white particles 82 and the black particles 83. In addition, in FIGS. 8A to 8D, drawings are simplified, and only the pixel electrode 21, the facing electrode 22, the first control line 75, and the second control line 76 are illustrated.

Figure 8A:
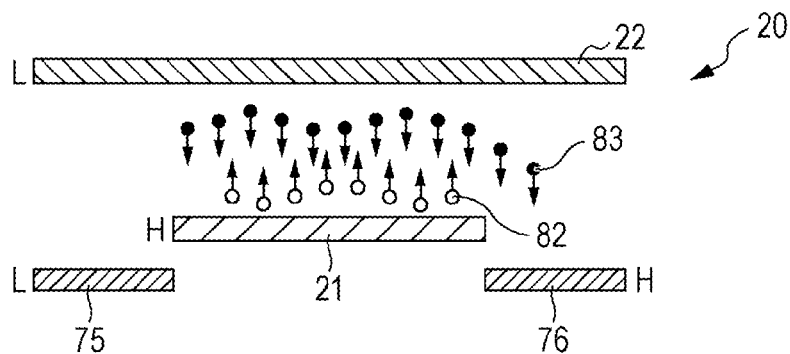
FIGS. 8A to 8D are views illustrating a phenomenon which is generated in the pixel.
Figure 8B:
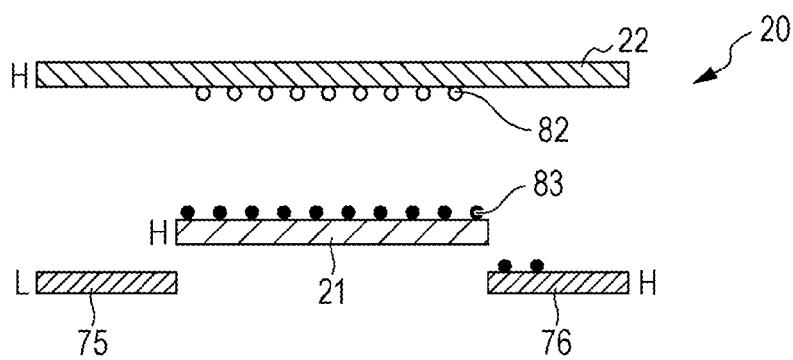
Figure 8C:
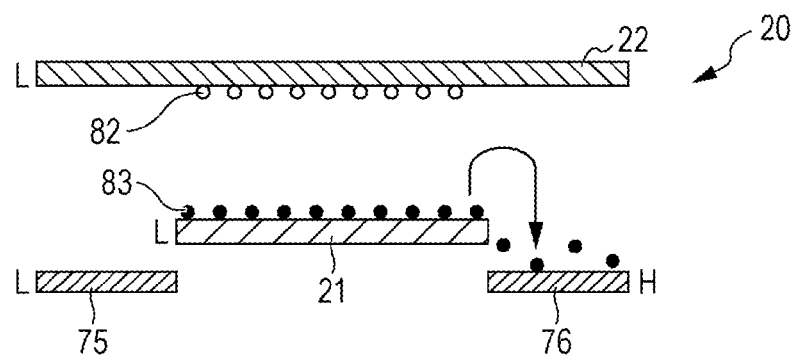
Figure 8D:
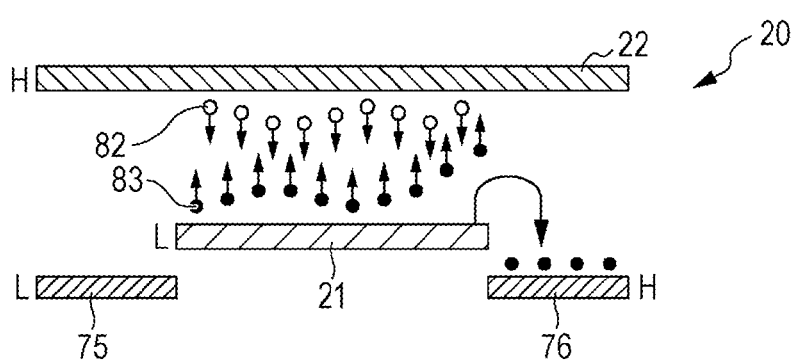

FIG. 8A corresponds to the first half portion ST2*a* of the image writing period ST2 when the black display switches to the white display in one certain pixel 20. FIG. 8B corresponds to the second half portion ST2*b* of the image writing period ST2 following FIG. 8A. In addition, FIG. 8C corresponds to the first half portion ST2*a* of the image writing period ST2 when the white display switches to the black display in one certain pixel 20. FIG. 8D corresponds to the second half portion ST2*b* of the image writing period ST2 following FIG. 8C.

When the black display switches to the white display in the pixel 20, in the first half portion ST2*a* of the image writing period ST2, the potential having 15 V (H) is input into the pixel electrode 21, and the potential having 0 V (L) is input into the facing electrode 22. At this time, as illustrated in FIG. 8A, the black particles 83 gravitate toward the pixel electrode 21 which has a relatively high potential with respect to the facing electrode 22 and the second control line 76 (the same potential as that of the pixel electrode 21). In addition, the white particles 82 gravitate to the facing electrode 22.

In addition, in the second half portion ST2*b* of the image writing period ST2, the potential having 15 V is input into the pixel electrode 21, and the potential Vcom having 15 V (H) is input into the facing electrode 22. For this reason, all of the facing electrode 22, the pixel electrode 21, and the second control line 76 have the same potential. Accordingly, the electric field is not generated between the pixel electrode 21 and the second control line 76 and between the pixel electrode 21 and the facing electrode 22, and as illustrated in FIG. 8B, the electrophoresis particles (the white particles 82 and the black particles 83) do not move from the above of the pixel electrode 21, the facing electrode 22, and the second control line 76.

Meanwhile, when the white display switches to the black display in the pixel 20, in the first half portion ST2*a* of the image writing period ST2, the potential having 0V (L) is input into the pixel electrode 21 from the first control line 75, and the potential having 0 V (L) is input into the facing electrode 22. At this time, since the potential of the second control line 76 is 15 V (H), as illustrated in FIG. 8C, the black particles 83 gravitate toward the second control line 76 which has a relatively high potential with respect to the facing electrode 22.

In addition, in the second half portion ST2*b* of the image writing period ST2, the potential Vcom having 15 V (H) is input into the facing electrode 22. For this reason, with respect to the pixel electrode 21, the second control line 76 and the facing electrode 22 have relatively high potentials. Therefore, as illustrated in FIG. 8D, the black particles 83 which are negatively charged move toward the facing electrode 22 from the above of the pixel electrode 21. In addition, the black particles 83 move toward the second control line 76 side from the above of the pixel electrode 21. In addition, the white particles 82 which are positively charged move toward the facing electrode 22 side.

In addition, the black particles 83 are deposited at a part (a void between the pixel electrodes 21) which is overlapped with the second control line 76 when viewed in a plan view. According to the structure, the second control line 76 can only obtain 0 V (for example, during a period other than an image writing period ST, such as the time when the power supply is OFF) or +15 V. For this reason, the deposited black particles 83 continue to remain on the second control line 76 or in the vicinity thereof. In a region (a region in which the second control line 76 and the partition 10 are overlapped with each other when viewed in a plan view) in which the partition 10 is provided between the second control line 76 and the facing electrode 22, such a behavior is suppressed to some extent. However, in a region (in other words, in a case where there is a part in which the second control line 76 and the facing electrode 22 are not overlapped with the partition 10 when viewed in a plan view) in which the partition 10 is not disposed between the second control line 76 and the facing electrode 22, the deposition of the electrophoresis particles is apparent.

For this reason, when a deposition amount of the black particles 83 exceeds a predetermined threshold value, the number of particles which contribute to displaying decreases, and in a case of a display unevenness or in a worst case, a problem that the display cannot be performed occurs. In addition, in FIGS. 8A to 8D, in order to make the description simple, although not illustrated in the drawings, the first control line 75 also causes a similar phenomenon to that of the second control line 76, and the deposition of the white particles 82 is generated as time goes by.

In the embodiment, the above-described electrostatic shielding layer 90 illustrated in FIGS. 6A and 6B is provided which prevents the deposition of the electrophoresis particles (the white particles 82 and the black particles 83). In addition, the potential can be input into the electrostatic shielding layer 90. The potential which is different from that of the pixel electrode 21 is input into the electrostatic shielding layer 90.

Figure 9:
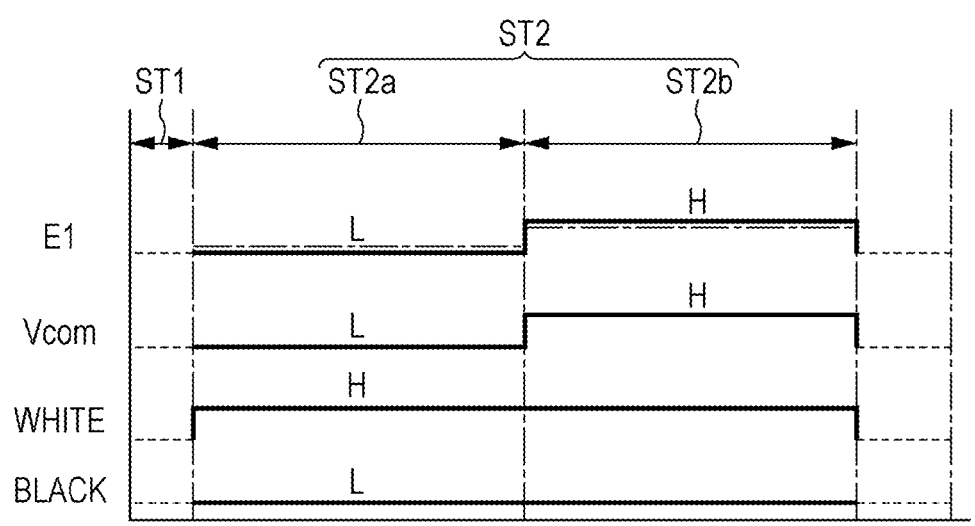
FIG. 9 is a view illustrating a relationship of potentials input into an electrostatic shielding layer, a facing electrode, and a pixel electrode.

FIG. 9 is a view illustrating a relationship of potentials input into the electrostatic shielding layer 90, the facing electrode 22, and the pixel electrode 21 (the pixel 20 of the black display, and the pixel 20 of the white display). In FIG. 9, the potential which is input into the electrostatic shielding layer 90 is illustrated as E1.

As illustrated in FIG. 9, in the embodiment, with respect to the electrostatic shielding layer 90, in synchronization with the timing when the potential is input into the facing electrode 22, the same potential as that of the facing electrode 22 is input. In other words, in the first half portion ST2a of the image writing period ST2, the potential having 0 V (L) which is the same potential as the potential Vcom which is input into the facing electrode 22 is input into the electrostatic shielding layer 90. In the second half portion ST2b of the image writing period ST2, the potential having 15 V (H) which is the same potential as the potential Vcom which is input into the facing electrode 22 is input into the electrostatic shielding layer 90. In this manner, in the embodiment, with respect to the electrostatic shielding layer 90, the potential is input during the writing operation of the image into the pixel 20 of the display portion 3.

By the electrostatic shielding layer 90, an operation illustrated in FIGS. 10A to 10D can be considered to be generated. In the embodiment, FIGS. 10A to 10D are cross sections for one certain pixel 20, and are views illustrating a movement of the white particles 82 and the black particles 83. FIG. 10A corresponds to the first half portion ST2a of the image writing period ST2 when the black display switches to the white display in one certain pixel 20. FIG. 10B corresponds to the second half portion ST2b of the image writing period ST2 following FIG. 10A. In addition, FIG. 10C corresponds to the first half portion ST2a of the image writing period ST2 when the white display switches to the black display in one certain pixel 20. FIG. 10D corresponds to the second half portion ST2b of the image writing period ST2 following FIG. 10C.

When the black display switches to the white display in the pixel 20, in the first half portion ST2a of the image writing period ST2, the potential having 15 V (H) is input into the pixel electrode 21, and the potential having 0 V (L) is input into the facing electrode 22 and the electrostatic shielding layer 90. The electrostatic shielding layer 90 shields the second control line 76 which has relatively high potential with respect to the facing electrode 22. Accordingly, the electric field is not generated between the second control line 76 and the facing electrode 22. In addition, the electrostatic shielding layer 90 has the same potential as that of the facing electrode 22. For this reason, as illustrated in FIG. 10A, as the black particles 83 receives a repulsive force from the electrostatic shielding layer 90, the black particles 83 gravitate only to the pixel electrode 21 which has a relatively high potential with respect to the facing electrode 22. In addition, the white particles 82 gravitate to the facing electrode 22.

In addition, in the second half portion ST2b of the image writing period ST2, the potential having 15 V (H) is input into the pixel electrode 21, and the potential having 15 V (H) is also input into the facing electrode 22 and the electrostatic shielding layer 90. For this reason, all of the facing electrode 22, the pixel electrode 21, and the electrostatic shielding layer 90 have the same potential. Accordingly, the electric field is not generated between the pixel electrode 21 and the facing electrode 22 and between the second control line 76 and the facing electrode 22, and as illustrated in FIG. 10B, the electrophoresis particles (the white particles 82 and the black particles 83) do not move from the above of the pixel electrode 21 and the facing electrode 22.

Meanwhile, when the white display switches to the black display in the pixel 20, in the first half portion ST2a of the image writing period ST2, the potential having 0 V (L) is input into the pixel electrode 21 from the first control line 75, and the potential having 0 V (L) is input into the facing electrode 22 and the electrostatic shielding layer 90. In addition, the potential of the second control line 76 is maintained to be 15 V (H). The electrostatic shielding layer 90 shields the second control line 76 which has a relatively high potential with respect to the facing electrode 22. Accordingly, the electric field is not generated between the second control line 76 and the facing electrode 22. In addition, the electrostatic shielding layer 90 has the same potential as that of the facing electrode 22. For this reason, as illustrated in FIG. 10C, the black particles 83 do not gravitate toward the second control line 76 which has a relatively high potential with respect to the facing electrode 22.

In addition, in the second half portion ST2b of the image writing period ST2, the potential having 15 V (H) is input into the facing electrode 22 and the electrostatic shielding layer 90. For this reason, with respect to the pixel electrode 21, the electrostatic shielding layer 90 and the facing electrode 22 has relatively high potentials. Therefore, as illustrated in FIG. 10D, the black particles 83 which are negatively charged move toward the facing electrode 22 from the above of the pixel electrode 21. In addition, the white particles 82 which are positively charged move toward the facing electrode 22 side.

Here, the black particles 83 move to the above of the electrostatic shielding layer 90 from the above of the pixel electrode 21, and are temporarily deposited. However, even in this case, again, when the black display switches to the white display, as illustrated in FIG. 10A, since the electrostatic shielding layer 90 generates the repulsive force with respect to the black particles 83, the black particles 83 which are temporarily deposited on the electrostatic shielding layer 90 are discharged.

In addition, with respect to the electrostatic shielding layer 90, compared to the potential difference (absolute value) between the facing electrode 22 and the pixel electrode 21, a potential which reduces the potential difference (absolute value) between the electrostatic shielding layer 90 and the facing electrode 22 may be input. Specifically, as illustrated as one-dot chain line in FIG. 9, the input potential into the electrostatic shielding layer 90 in the first half portion ST2a of the image writing period ST2 may be slightly higher than 0 V, and the input potential into the electrostatic shielding layer 90 in the second half portion ST2b of the image writing period ST2 may be slightly lower than 15 V.

According to this, since the potential difference between the electrostatic shielding layer 90 and the facing electrode 22 is smaller than the potential difference between the facing electrode 22 and the pixel electrode 21, it is possible to actively move the black particles 83 which are deposited on the electrostatic shielding layer 90 illustrated in FIG. 10D to the facing electrode side.

As described above, according to the electrophoresis display device 100 of the embodiment, since the potential which is different from that of the pixel electrode 21 is input into the electrostatic shielding layer 90 which is overlapped with the first control line 75 and the second control line 76, the potential generated between the first control line 75 and the facing electrode 22 and between the second control line 76 and the facing electrode 22 is shielded.

Accordingly, the electric field is not generated between the first control line 75 and the facing electrode 22 and between the second control line 76 and the facing electrode 22. Accordingly, at a part which corresponds to the first control line 75 and the second control line 76, the white particles 82 and the black particles 83 are unevenly distributed and do not remain.

Therefore, it is possible to obtain excellent display quality without a display unevenness as the deposition of the electrophoresis particles is suppressed.

In addition, in the embodiment, in synchronization with the potential input into the facing electrode 22, the same potential as the input potential into the facing electrode 22 is input into the electrostatic shielding layer 90. Accordingly, since the potential of the electrostatic shielding layer 90 changes according to the potential of the facing electrode 22, as illustrated in FIGS. 10A to 10D, it is possible to expel the electrophoresis particles which are temporarily deposited on the electrostatic shielding layer 90 by the repulsive force.

In addition, in the embodiment, since the electrostatic shielding layer 90 is formed to be overlapped with the end portion of the pixel electrode 21 when viewed in a plan view, generation of a void between the pixel electrode 21 and the electrostatic shielding layer 90 when viewed in a plan view is prevented. Accordingly, generation of the electric field between the first control line 75 and the facing electrode 22 and between the second control line 76 and the facing electrode 22 from the void is prevented.

In addition, in the embodiment, a case where the potential is input during the writing operation of the image into the pixel 20 of the display portion 3 with respect to the electrostatic shielding layer 90 is exemplified, but the invention is not limited thereto. For example, the potential may be input into the electrostatic shielding layer 90 at a timing when the writing operation of the image is ended. In other words, the potential may be input into the electrostatic shielding layer 90 for every one frame in which the writing of the image into the pixel 20 of the display portion 3 is completed. Here, the image signal input into the pixel 20 is performed by the scanning line drive circuit 60 and the data line drive circuit 70, a period of selecting all of the scanning lines 40 consecutively for one time is considered as one frame (one frame period).

In this case, the potential in a pulse shape may be input into the electrostatic shielding layer 90. The pulse has a reversed polarity to the potential which is input into the pixel electrode 21 during the image writing. For example, when the low level (L) potential is input into the pixel electrode 21 during the image writing, the high level (H) potential may be input into the electrostatic shielding layer 90. According to this, since the potential having reversed polarity is input into the electrostatic shielding layer 90, even when the electrophoresis particles remain in the vicinity of the electrostatic shielding layer 90, it is possible to remove the electrophoresis particles by the repulsive force.

In addition, the potential which is input into the electrostatic shielding layer 90 may be reversed for every one frame. In other words, the reversed potential of the potential which is input into the facing electrode 22 may be input into the electrostatic shielding layer 90. In the pixel which continues to display the same image, the facing electrode 22 and the pixel electrode 21 maintain the same potential. For this reason, there is a possibility that the electrophoresis particles are deposited at a part which corresponds to the electrostatic shielding layer 90.

In contrast, as described above, when the reversed potential to that of the facing electrode 22 is input, as the potential difference is generated between the pixel electrode 21 and the electrostatic shielding layer 90, it is possible to expel the electrophoresis particles deposited on the electrostatic shielding layer 90 by the repulsive force.

In addition, in the embodiment, a case where the electrostatic shielding layer 90 is provided on layers between the first control line 75 and the pixel electrode 21 and between the second control line 76 and the pixel electrode 21 is exemplified, but the invention is not limited thereto. For example, the electrostatic shielding layer 90 may be formed on the same layer as the pixel electrode 21. In this case, the electrostatic shielding layer 90 is configured of, for example, wiring layers or the like which are wound around between the pixel electrodes 21. In this configuration, since the electrostatic shielding layer 90 is disposed on the same layer as the pixel electrode 21, one layer for providing the electrostatic shielding layer 90 is not required. Accordingly, it is possible to reduce one layer in the layered structure, and to cause the layered structure of the electrophoresis display device 100 to be thin.

Figure 11:
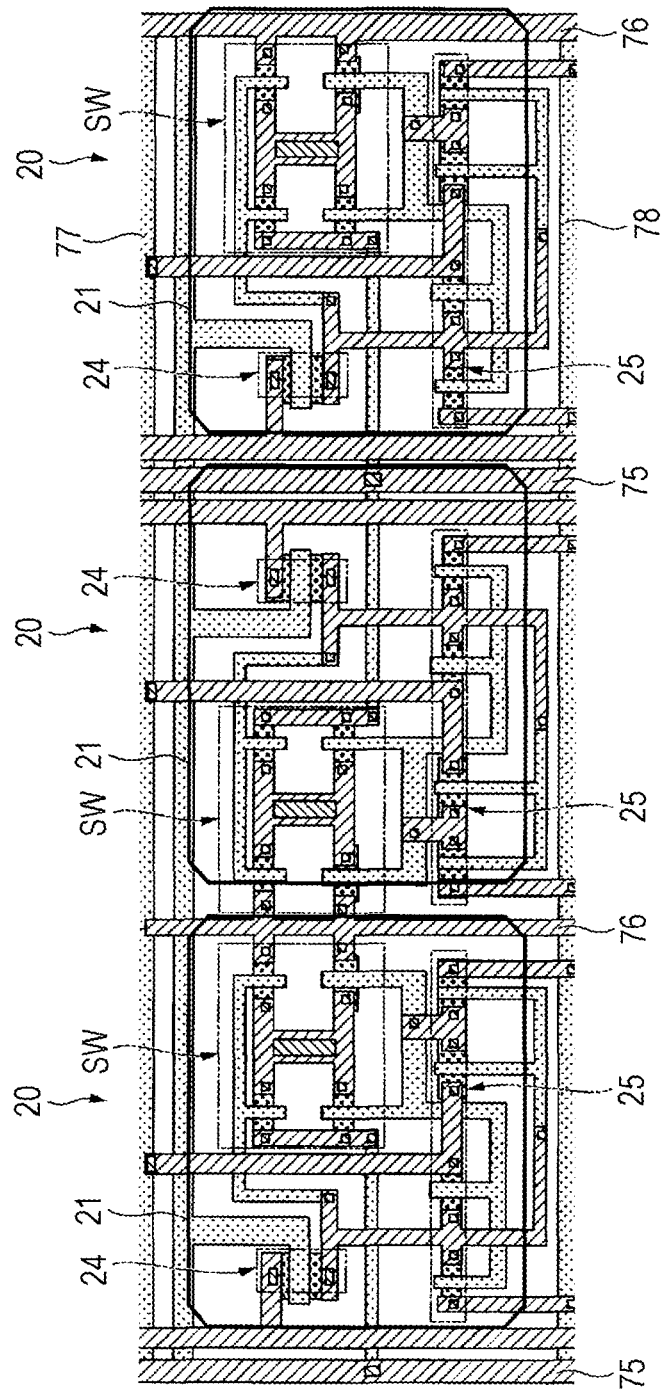
FIG. 11 is a plan view of a pixel in a case where a part of the pixel electrode is used as the electrostatic shielding layer.

Otherwise, the electrostatic shielding layer may be configured of a part of the pixel electrode 21. FIG. 11 is a view illustrating a plane structure of the pixel 20 in a case where a part of the pixel electrode 21 is used as the electrostatic shielding layer. As illustrated in FIG. 11, the pixel electrode 21 has a shape which covers any one of the first control line 75 or the second control line 76 when viewed in a plan view.

Even in this configuration, since the electric field between the first control line 75 and the facing electrode 22 and between the second control line 76 and the facing electrode 22 disappears, it is possible to remove the electrophoresis particles which face the first control line 75 and the second control line 76 from the facing electrode 22. Therefore, the electrophoresis particles are not deposited on the first control line 75 and the second control line 76, and a problem that a display defect is generated does not occur.

In addition, in the above-described embodiment, a case where the pixel 20 includes the pixel switching element 24, the latch circuit 25, the switch circuit SW, the first control line 75 and the second control line 76 which are connected to the switch circuit SW, is exemplified as the pixel circuit, but the invention is not limited thereto. In the invention, when displaying the image, if any one of two or more control lines (including the power supply line) to which a certain amount of potential is applied and the pixel electrode are electrically connected to each other and the electrophoresis element is driven, the structure of the pixel circuit is not limited. For example, the invention can be employed in the electrophoresis display device 101 which is provided with the pixel circuit illustrated in FIG. 12. In addition, in FIG. 12, a pixel circuit 110 in the pixel 20 of a first line and a first row, is illustrated. Since the configurations of each pixel circuit 110 are the same as each other, here, as a representative example thereof, the pixel circuit 110 of a first line and a first row will be described, and the description of other pixel circuits 110 will be omitted.

The pixel circuit 110 includes a TFT 131 (first transistor), a TFT 132 (second transistor), a TFT 133 (third transistor), and a TFT 134 (fourth transistor). A gate of the TFT 133 is connected to the scanning line 40, and a source of the TFT 133 is connected to a first data line 50A. A gate of the TFT 134 is connected to the scanning line 40, and a source of the TFT 134 is connected to a second data line 50B.

A gate of the TFT 131 is connected to a drain of the TFT 133, and a first potential Ve1 is input into a source of the TFT 131 by a first control line 175. A gate of the TFT 132 is connected to a drain of the TFT 134, and a second potential Vet is input into a source of the TFT 132 by a second control line 176. In addition, a drain of the bottom surface TFT 131 and a drain of the TFT 132 are connected to the pixel electrode 21.

Next, a driving method in a case where the pixel 20 is displayed in black and a driving method in a case where the pixel 20 is displayed in white will be described. When the image is displayed on a pixel 29, the potential Vcom is input into the facing electrode 22. Here, the first potential Ve1 is higher than the potential Vcom, and the second potential Ve2 is lower than the potential Vcom.

For example, when the pixel 20 of the first line and the first row is white, a data line driving circuit (not illustrated) supplies an H level data signal to the first data line 50A of the first row, and supplies an L level data signal to the second data line 50B of the first row. In a state where the TFT 133 is ON, when the first data line 50A reaches the H level, the gate of the TFT 131 reaches the H level, and the TFT 131 is ON. In addition, in a state where the TFT 134 is ON, when the second data line 50B reaches the L level, the gate of the TFT 132 reaches the L level, and the TFT 132 is OFF. When the TFT 131 is ON and the TFT 132 is OFF, the first potential Ve1 is input into the pixel electrode 21 by the first control line 175. Here, since the potential of the pixel electrode 21 is higher than the potential Vcom which is input into the facing electrode 22, on the electrophoresis layer 80, the white electrophoresis particles which are positively charged move toward the facing electrode 22 side, and the black electrophoresis particles which are negatively charged move to the pixel electrode 21 side.

Meanwhile, for example, when the pixel of the first line and the first row is black, during a period when the scanning line 40 of the first line reaches the H level, the data line driving circuit (not illustrated) supplies the L level data signal to the first data line 50A of the first row and supplies the H level data signal to the second data line 50B of the first row. In a state where the scanning line 40 reaches the H level and the TFT 133 is ON, when the first data line 50A reaches the L level, the gate of the TFT 131 reaches the L level, and the TFT 131 is OFF. In addition, in a state where the scanning line 40 reaches the H level and TFT 134 is ON, when the second data line 50B reaches the H level, the gate of the TFT 132 reaches the H level, and the TFT 132 is ON. When the TFT 131 is OFF and the TFT 132 is ON, the second potential Vet is input into the pixel electrode 21 by the second control line 176. Here, since the potential of the pixel electrode 21 is lower than the potential Vcom which is input into the facing electrode 22, on the electrophoresis layer 80, the black electrophoresis particles which are negatively charged move toward the pixel electrode 21 side, and the white electrophoresis particles which are positively charged move to the facing electrode 22 side.

Figure 12:
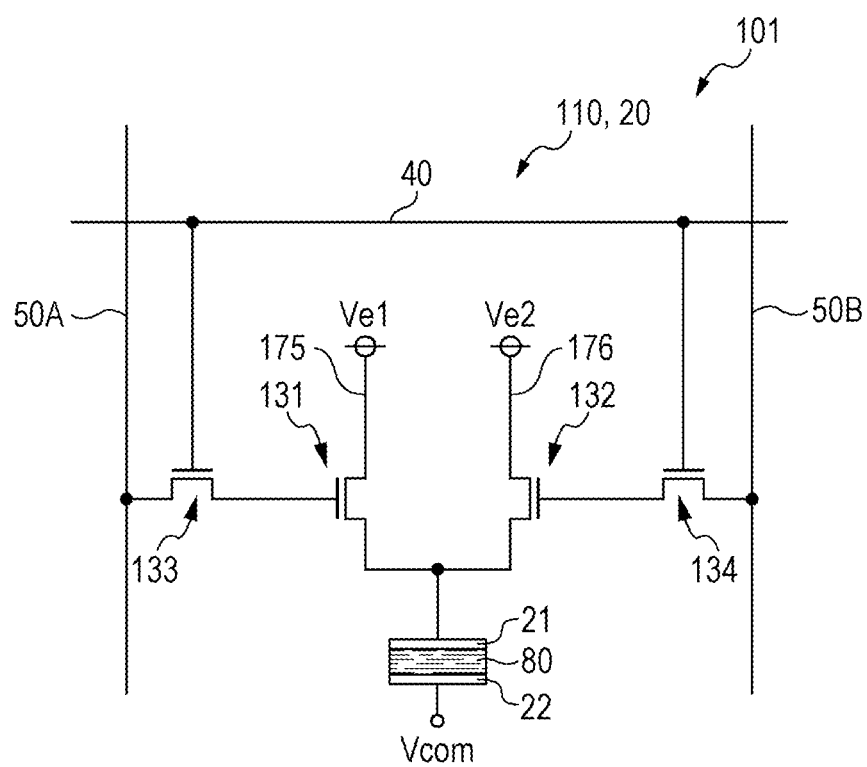
FIG. 12 is a circuit diagram of the electrophoresis display device which is provided with an additional pixel circuit.

According to the pixel circuit 110 illustrated in FIG. 12, when the display of the pixel 20 changes, one time of application of a voltage to the pixel electrode 21 is sufficient. For this reason, it is possible to suppress power consumption. In addition, since it is possible to cause the voltage which is applied to the pixel electrode 21 to be different for every pixel 20, by selecting the scanning line 40 for one time, regarding the pixel 20 of the same line, it is possible to change a certain pixel into the black display, and to change another pixels into the white display. In addition, since a memory is not provided for every pixel, it is possible to make a high definition compared to a configuration in which a memory circuit (latch circuit) is provided for every pixel.

In the embodiment, in the above-described pixel circuit 110, as the electrostatic shielding layer 90 is provided so that the first control line 75 which is connected to the pixel electrode 21 of each pixel 20 and the second control line 176 are overlapped with each other when viewed in a plan view, it is possible to prevent the electrophoresis particles from being deposited at a part which corresponds to the first control line 75 and the second control line 176.

Electronic Apparatus

Next, a case where the electrophoresis display device of the above-described embodiment is employed in an electronic apparatus will be described.

Figure 13A:
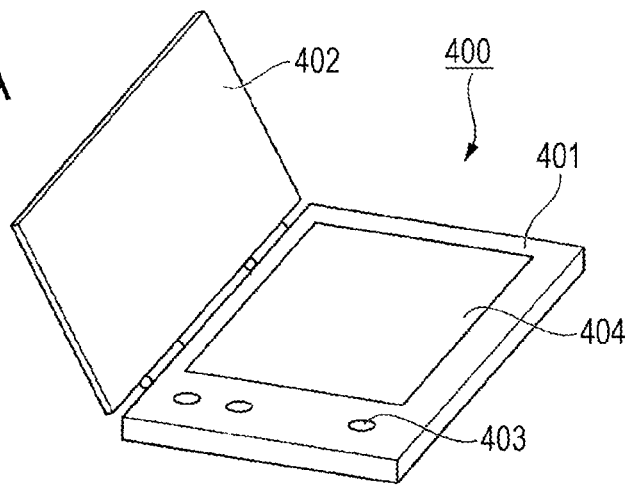
FIGS. 13A to 13C are views illustrating a configuration according to an example of an electronic apparatus.
Figure 13B:
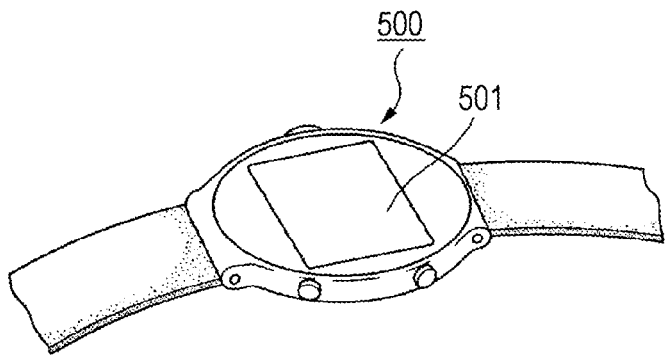
Figure 13C:
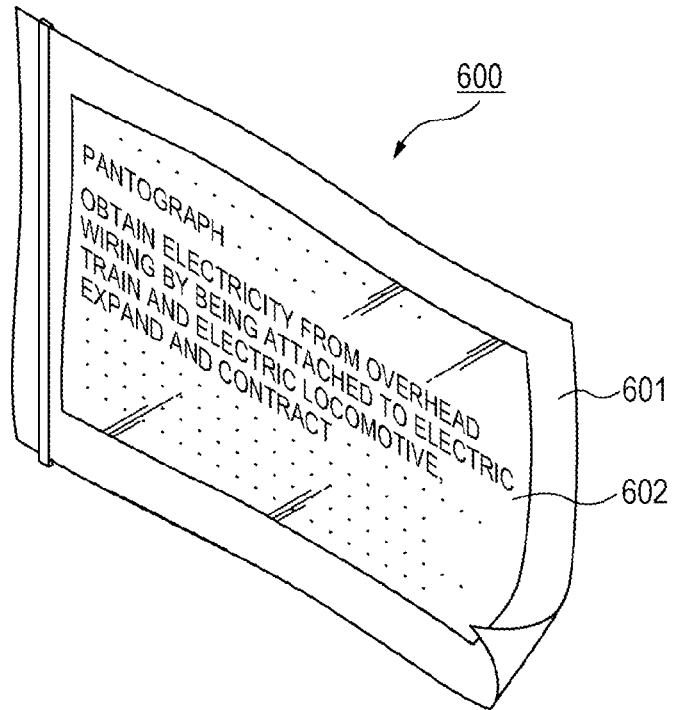

FIGS. 13A to 13C are perspective views illustrating specific examples of the electronic apparatus which employs the electrophoresis display device of the invention.

FIG. 13A is a perspective view illustrating an electronic book which is an example of the electronic apparatus. This electronic book (electronic apparatus) 400 includes a book-shaped frame 401, a cover 402 which is provided to be freely rotated (can be opened and closed) with respect to the frame 401, an operation portion 403, and a display portion 404 which is configured of the electrophoresis display device of the invention.

FIG. 13B is a perspective view illustrating a watch which is an example of the electronic apparatus. This watch (electronic apparatus) 500 includes a display portion 501 which is configured of the electrophoresis display device of the invention.

FIG. 13C is a perspective view illustrating an electronic paper which is an example of the electronic apparatus. This electronic paper (electronic apparatus) 600 includes a main body portion 601 which is configured of a rewritable sheet that has the same texture and flexibility as a paper sheet, and a display portion 602 which is configured of the electrophoresis display device of the invention.

For example, since the electronic book or the electronic paper are assumed to be used in repeating the writing letters on the white background, it is required that the problem regarding the display unevenness be solved.

In addition, a range of the electronic apparatus which can employ the electrophoresis display device of the invention is not limited thereto, and widely includes apparatuses which use a change of color that is confirmed visually according to a movement of charged particles.

Since the electrophoresis display device according to the invention is employed, the above-described electronic book 400, the watch 500, and the electronic paper 600 are the electronic apparatuses having excellent quality in reliability which causes high display quality characteristics as the display unevenness is suppressed.

In addition, the above-described electronic apparatuses are examples of the electronic apparatus according to the invention, and do not limit technology range of the invention. For example, it is possible to appropriately employ the electrophoresis display device according to the invention even in a display portion of the electronic apparatus, such as a mobile phone or a portable audio device, a sheet for work, such as a manual, a text book, a workbook, or an information sheet.

The entire disclosure of Japanese Patent Application No. 2014-008795, filed Jan. 21, 2014 is expressly incorporated by reference herein.

What is claimed is:

1. An electrophoresis display device, comprising:
a pair of substrates;
an electrophoresis layer which is pinched between the pair of substrates, and includes a partition and electrophoresis particles that are disposed in plural regions which are divided by the partition;
a display portion which includes a plurality of pixels;
a pixel electrode which is formed on each of the plurality of pixels;
a facing electrode which faces the plurality of pixel electrodes via the electrophoresis layer;
a first control line and a second control line which are electrically connected to the pixel electrodes and have a part that is not overlapped with the partition when viewed in a plan view; and
a shielding layer which is disposed between the first control line and the electrophoresis layer and between the second control line and the electrophoresis layer, is overlapped with the first control line and the second control line when viewed in a plan view, and performs a potential input.

2. The electrophoresis display device according to claim 1, wherein a potential which is different from that of the pixel electrode is input into the shielding layer.

3. An electronic apparatus, comprising:
the electrophoresis display device according to claim 2.

4. The electrophoresis display device according to claim 1, wherein the same potential as the potential which is input into the facing electrode is input into the shielding layer during an image writing period.

5. An electronic apparatus, comprising:
the electrophoresis display device according to claim 4.

6. The electrophoresis display device according to claim 1, wherein a potential is input into the shielding layer so that a potential difference between the shielding layer and the facing electrode is small compared to a potential difference between the facing electrode and the pixel electrode during an image writing period.

7. An electronic apparatus, comprising:
the electrophoresis display device according to claim 6.

8. The electrophoresis display device according to claim 1, wherein a potential which is reversed with respect to a potential of the facing electrode is input into the shielding layer, for a certain period in which an image is written into the display portion.

9. An electronic apparatus, comprising:
the electrophoresis display device according to claim 8.

10. The electrophoresis display device according to claim 1, wherein a potential during an image writing operation into the display portion is input into the shielding layer.

11. The electrophoresis display device according to claim 1, wherein the shielding layer is formed on the same layer as the pixel electrode.

12. The electrophoresis display device according to claim 1, wherein the shielding layer is formed on a layer between the pixel electrode and the first control line and between the pixel electrode and the second control line.

13. The electrophoresis display device according to claim 12, wherein the shielding layer is formed to be overlapped with an end portion of the pixel electrode when viewed in a plan view.

14. The electrophoresis display device according to claim 1, wherein the shielding layer is formed to be integrated with the pixel electrode.

15. A driving method of an electrophoresis display device including a pair of substrates, an electrophoresis layer which is pinched between the pair of substrates, and includes a partition and electrophoresis particles that are disposed in plural regions which are divided by the partition, a display portion which includes a plurality of pixels, a pixel electrode which is formed on each of the plurality of pixels, a facing electrode which faces the plurality of pixel electrodes via the electrophoresis layer, a first control line and a second control line which are electrically connected to the pixel electrodes and have a part that is not overlapped with the partition when viewed in a plan view, and a shielding layer which is disposed between the first control line and the electrophoresis layer and between the second control line and the electrophoresis layer, and is overlapped with the first control line and the second control line when viewed in a plan view, comprising:
inputting a potential which is different from that of the pixel electrode into the shielding layer.

16. The driving method of an electrophoresis display according to claim 15, wherein, in inputting the potential, the same potential as the potential which is input into the facing electrode is input into the shielding layer.

17. The driving method of an electrophoresis display according to claim 15, wherein, in inputting the potential, the potential is input into the shielding layer so that a potential difference between the shielding layer and the facing electrode is small compared to a potential difference between the facing electrode and the pixel electrode.

18. The driving method of an electrophoresis display according to claim 15, wherein inputting the potential is performed for every one frame period in which an image is written into the display portion, and polarity of the potential which is input into the shielding layer for every frame period is reversed.

19. The driving method of an electrophoresis display according to claim 15, wherein inputting the potential is performed during an image writing operation into the display portion.

20. An electronic apparatus, comprising:
the electrophoresis display device according to claim 1.

* * * * *